(12) United States Patent
Chen et al.

(10) Patent No.: US 9,610,536 B2
(45) Date of Patent: Apr. 4, 2017

(54) RECIRCULATED-SUSPENSION PRE-CALCINER SYSTEM

(75) Inventors: Wei-Cheng Chen, New Taipei (TW);
Wan-Hsia Liu, Hsinchu (TW);
Chin-Ming Huang, New Taipei (TW);
Shoung Ouyang, Taipei (TW);
Heng-Wen Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 466 days.

(21) Appl. No.: 13/590,126

(22) Filed: Aug. 20, 2012

(65) Prior Publication Data
US 2013/0164202 A1    Jun. 27, 2013

(30) Foreign Application Priority Data

Dec. 23, 2011    (TW) ............... 100148226 A
May 9, 2012    (TW) ............... 101116464 A

(51) Int. Cl.
*C01B 13/18*    (2006.01)
*B01J 6/00*    (2006.01)
(Continued)

(52) U.S. Cl.
CPC ............ *B01D 53/62* (2013.01); *B01D 53/10* (2013.01); *B01D 53/96* (2013.01); *B01J 6/004* (2013.01); *B01J 8/0055* (2013.01); *B01J 8/14* (2013.01); *C01B 13/18* (2013.01); *C01F 5/06* (2013.01); *C01F 11/06* (2013.01); *C01G 9/02* (2013.01);
(Continued)

(58) Field of Classification Search
None
See application file for complete search history.

(56) References Cited

U.S. PATENT DOCUMENTS 3,790,334 A * 2/1974 Cohen .................. C04B 20/065
                                                           34/592
3,861,332 A * 1/1975 Itasaka ..................... F23G 5/165
                                                          110/212

(Continued)

FOREIGN PATENT DOCUMENTS

CN         1753843        3/2006
CN       101065337       10/2007

(Continued)

OTHER PUBLICATIONS

Machine translation for DE 102009013935 B3 (Jul. 2010).*

(Continued)

*Primary Examiner* — Jennifer A Leung

(57) ABSTRACT

A recirculated-suspension pre-calciner system is disclosed, comprising: a vortex cyclone dust collecting equipment including a plurality of devices, wherein a top device of the vortex cyclone dust collecting equipment is used as a feed system; a vertical combustion kiln; a blower; and a powder purge system, wherein powders in the feed system fall into the vortex cyclone dust collecting equipment and pass through a plurality of the devices to mix and exchange heat with flue gas comprising $CO_2$, generating calcination reaction and releasing CO2 into the flue gas. and the steam is separated and transported to the feed system by the blower and acts as a carrier gas of powders.

19 Claims, 1 Drawing Sheet

(51) Int. Cl.
- *B01J 8/14* (2006.01)
- *C01F 11/06* (2006.01)
- *B01D 53/62* (2006.01)
- *B01J 8/00* (2006.01)
- *C01F 5/06* (2006.01)
- *C01G 9/02* (2006.01)
- *C01G 25/02* (2006.01)
- *C01G 45/02* (2006.01)
- *C01G 53/04* (2006.01)
- *C04B 2/10* (2006.01)
- *B01D 53/10* (2006.01)
- *B01D 53/96* (2006.01)
- *C04B 7/43* (2006.01)
- *C04B 111/00* (2006.01)

(52) U.S. Cl.
CPC ............. *C01G 25/02* (2013.01); *C01G 45/02* (2013.01); *C01G 53/04* (2013.01); *C04B 2/10* (2013.01); *C04B 7/434* (2013.01); *B01D 2251/402* (2013.01); *B01D 2251/404* (2013.01); *B01D 2251/602* (2013.01); *C04B 2111/00017* (2013.01); *Y02C 10/04* (2013.01); *Y02E 20/326* (2013.01); *Y02P 40/18* (2015.11); *Y02P 40/42* (2015.11)

(56) References Cited

U.S. PATENT DOCUMENTS

| | | | | |
|---|---|---|---|---|
| 4,025,295 | A | * | 5/1977 | Touborg .................. 432/14 |
| 4,118,177 | A | * | 10/1978 | Weber et al. ............. 432/14 |
| 4,169,701 | A | | 10/1979 | Katayama et al. |
| 4,483,831 | A | * | 11/1984 | Schmidt et al. ............ 423/175 |
| 4,707,350 | A | * | 11/1987 | Baudequin et al. .......... 423/637 |
| 5,595,599 | A | * | 1/1997 | Yokota et al. ............. 106/744 |
| 6,773,259 | B1 | | 8/2004 | Bech et al. |
| 7,549,859 | B2 | * | 6/2009 | Dupuis ..................... 432/58 |
| 7,682,447 | B1 | | 3/2010 | Laux et al. |
| 2001/0038989 | A1 | | 11/2001 | Ramesohl et al. |
| 2002/0174806 | A1 | | 11/2002 | Ramesohl et al. |
| 2003/0143508 | A1 | | 7/2003 | Ramesohl et al. |
| 2004/0173096 | A1 | | 9/2004 | Terasaki et al. |
| 2005/0181322 | A1 | | 8/2005 | Jensen |
| 2007/0122762 | A1 | | 5/2007 | Hoffis et al. |
| 2007/0178418 | A1 | | 8/2007 | Meyer et al. |
| 2009/0133607 | A1 | | 5/2009 | Hansen |
| 2010/0077943 | A1 | | 4/2010 | Fogash et al. |
| 2010/0329963 | A1 | | 12/2010 | Sceats et al. |

FOREIGN PATENT DOCUMENTS

| | | | |
|---|---|---|---|
| CN | 100368118 | | 2/2008 |
| CN | 101423339 | | 5/2009 |
| CN | 102112833 | | 6/2011 |
| DE | 102009013935 B3 | * | 7/2010 |
| EP | 0008770 A1 | * | 3/1980 ............. B01D 53/34 |
| FR | 2584308 A1 | * | 1/1987 |
| JP | 10-152353 | | 6/1998 |
| JP | 2008-239359 | | 10/2008 |
| TW | 201141598 | | 12/2011 |
| WO | WO 2010012880 | | 2/2010 |

OTHER PUBLICATIONS

English machine translation for EP 0008770 A1 (Mar. 1980).*
China Patent Office, Office Action, Patent Application Serial No. 201110451552.0, May 16, 2014, China.
Luis M. Romeo et al., "Reduction of Greenhouse Gas Emissions by Integration of Cement Plants, Power Plants, and $CO_2$ Capture Systems," Greenhouse Gas Science and Technology, Feb. 2011, pp. 72-82, vol. 1, Society of Chemical Industry and John Wiley & Sons, Ltd. US.
Dursun Can Ozcan et al., "Process Integration of Ca-Looping Process with a Cement Manufacturing Plant," Joint UK CCSC and CO2CHEM Meeting, Jul. 14, 2011, 15 pages, Nottingham.
J. Blamey et al., "The Calcium Looping Cycle for Large-Scale $CO_2$ Capture," Progress in Energy and Combustion Science, Apr. 2010, pp. 260-279, vol. 36, Elsevier, US.
A. MacKenzie et al., "Economics of $CO_2$ Capture Using the Calcium Cycle with a Pressurized Fluidized Bed Combustor," Energy & Fuels, Feb. 2007, pp. 920-926, vol. 21, American Chemical Society, US.
Yang Yongping et al., "Integration and Evaluation of a Power Plant with a CaO-based $CO_2$ Capture System," Internationla Journal of Greenhouse Gas Control, Jul. 2010, pp. 603-612, Elsevier, US.
Luis M. Romeo et al., "Oxyfuel Carbonation/Calcination Cycle for Low Cost $CO_2$ Capture in Existing Power Plants," Energy Conversion and Management, Oct. 2008, pp. 2809-2814, vol. 49, Elsevier, US.
Taiwan Patent Office, Office Action, Patent Application Serial No. 101116464. May 6, 2014, Taiwan.
Taiwan Patent Office, Office Action, Patent Application Serial No. 101116464, Dec. 1, 2014, Taiwan.

* cited by examiner

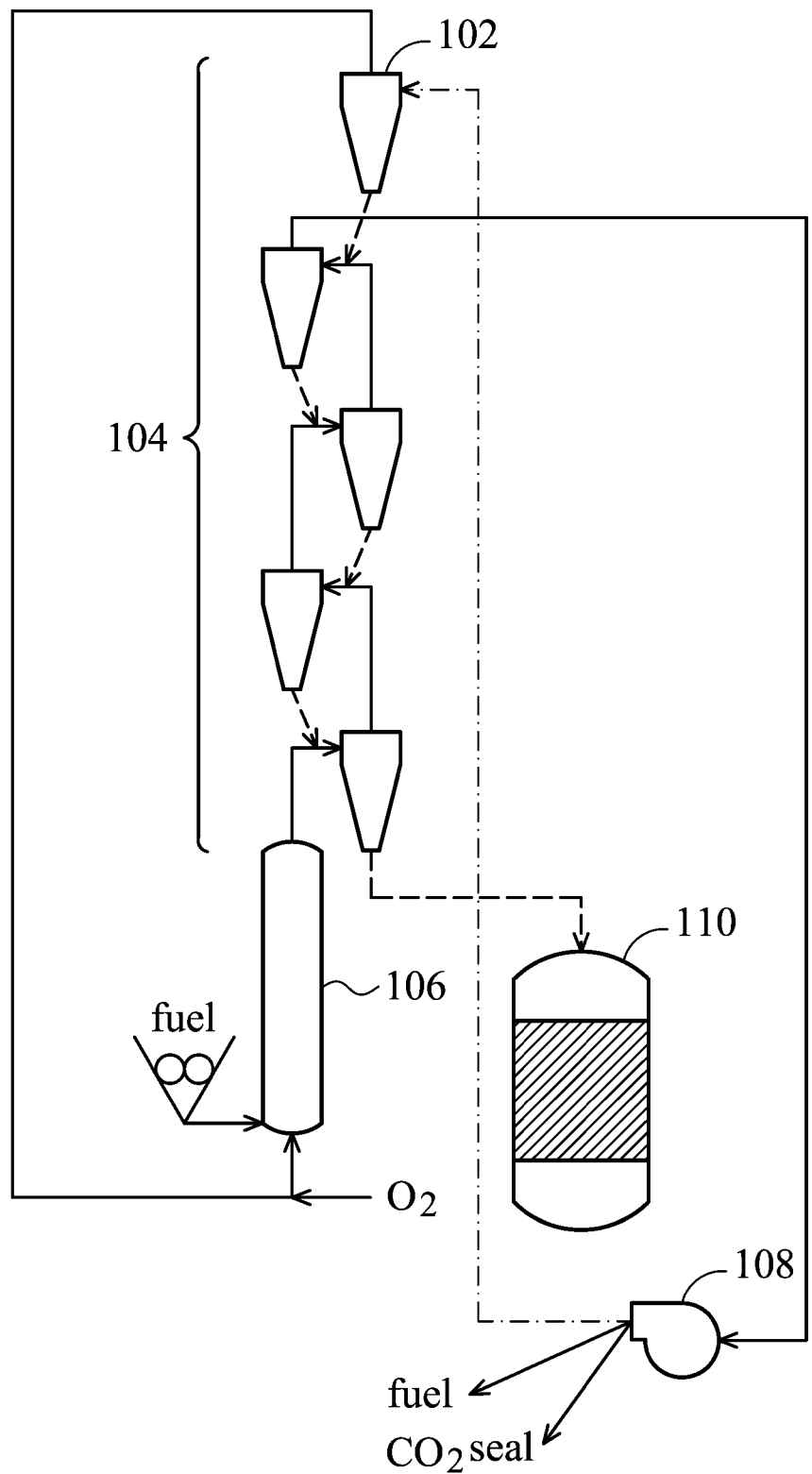

RECIRCULATED-SUSPENSION PRE-CALCINER SYSTEM

CROSS-REFERENCE TO RELATED APPLICATION

This Application claims priority of Taiwan Patent Application No. 100148226, filed on Dec. 23, 2011, and claims priority of Taiwan Patent Application No. 101116464, filed on May 09, 2012, the entirety of which is incorporated by reference herein.

BACKGROUND

Technical Field

The present disclosure relates an exhaust treating apparatus and more particularly to a recirculated-suspension pre-calciner system.

Description of the Related Art

In 2006, the energy industry, i.e. energy converting industry released 164086000 tons of $CO_2$ which was 61.86% of the total release of fuel combustion in Taiwan if departments do not share $CO_2$ used for electricity power. But, if departments share $CO_2$ used for electricity power, the energy industry, i.e. energy transferring, released 18509000 tons of $CO_2$ which was 6.98% of the total release of fuel combustion in Taiwan. According to the data described above, $CO_2$ from the energy industry electricity generating for the departments is 54.88% of total release of fuel combustion, which almost exceeded half of the total release of $CO_2$ in Taiwan. Therefore, if the release of $CO_2$ from power plants can be effectively captured, the release of $CO_2$ can be reduced significantly.

The cement industry is a major contributor to the release of $CO_2$, but air combustion and equipment's sealing are not good enough, such that even a calciner is performed to generate $CO_2$, the release of flue gas only has a $CO_2$ concentration of 25-30%. A new $CO_2$ capture technology is required for increasing the $CO_2$ concentration to gain a beneficial result of $CO_2$ reuse and sequestration. In addition, the cement industry is one of six consuming energy industry, which the process uses air combustion and usually the process does not prevent heat dissipation. Therefore, heat loss is too much and fuel utilization efficiency is low. One method to increase efficiency is to recover waste heat to generate electricity power, but it has a high cost and requires a large space. Furthermore, the conventional technology cannot get business opportunity of lightweight calcium carbonate.

BRIEF SUMMARY

The disclosure provides a recirculated-suspension pre-calciner system, comprising a vortex cyclone dust collecting equipment comprising a plurality of devices. A vertical combustion kiln comprises a top side and a bottom side, wherein the top side of the vertical combustion kiln is connected to the lowest device of the vortex cyclone dust collecting equipment, and the bottom side of the vertical combustion kiln is connected to the highest device of the vortex cyclone dust collecting equipment. A blower is connected to the highest device of the vortex cyclone dust collecting equipment, and a powder purge system is connected to the lowest device of the vortex cyclone dust collecting equipment.

The disclosure provides a recirculated-suspension pre-calciner system, comprising a vortex cyclone dust collecting equipment including: a plurality of devices, wherein a top device of the vortex cyclone dust collecting equipment is used as a feed system; a vertical combustion kiln; a blower; and a powder purge system, wherein powders in the feed system fall into the vortex cyclone dust collecting equipment and pass through a plurality of the devices to mix and exchange heat with flue gas, generating calcination reaction and releasing $CO_2$ into the flue gas, and the stream is separated and is transported to the feed system by the blower and acts as a carry gas of powders.

BRIEF DESCRIPTION OF DRAWINGS

The disclosure can be more fully understood by reading the subsequent detailed description and examples with references made to the accompanying drawings, wherein, FIG. 1 shows a sketch diagram of a recirculated-suspension pre-calciner system of an embodiment of the disclosure.

DETAILED DESCRIPTION OF DISCLOSURE

It is understood that specific embodiments are provided as examples to teach the broader inventive concept, and one of ordinary skill in the art can easily apply the teaching of the present disclosure to other methods or apparatus. The following discussion is only used to illustrate the disclosure, not limit the disclosure.

The disclosure discloses a calcination equipment of a $CO_2$ capturing system, which captures released $CO_2$, for example, from power plants to substantially increase capture of $CO_2$, reuse adsorbents, reduce reaction time and save fuel, and may reduce capture cost of $CO_2$. The disclosure may apply a recirculated-suspension pre-calciner to calcinate adsorbents, for example $CaCO_3$ is calcinated to CaO, to fabricate a lightweight calcium carbonate or capture $CO_2$.

FIG. 1 shows a sketch diagram of a recirculated-suspension pre-calciner system of an embodiment of the disclosure. Referring to FIG. 1, the recirculated-suspension pre-calciner system of the embodiment comprises a feed system 102, a vortex cyclone dust collecting equipment 104 including a plurality of devices, a vertical combustion kiln 106, a blower 108 and a powder purge system 110, wherein a top device of the vortex cyclone dust collecting equipment 104 is used as the feed system 102. A bottom side of the a device of the vortex cyclone dust collecting equipment 104 is connected through a rotary valve or flange to another device of the vortex cyclone dust collecting equipment 104 to separate pressure of the devices therebetween. As shown in FIG. 1, the vertical combustion kiln 106 comprises a top side and a bottom side, wherein the top side of the vertical combustion kiln 106 is connected to the lowest device of the vortex cyclone dust collecting equipment 104. The bottom side of the vertical combustion kiln 106 is connected to the highest device of the vortex cyclone dust collecting equipment 104. The blower 108 is connected to the highest device of the vortex cyclone dust collecting equipment 104. The powder purge system 110 is connected to the lowest device of the vortex cyclone dust collecting equipment 104.

The feed system 102 is operated by using the blower 108 to move high temperature $CO_2$ with temperatures of 600° C.~1000° C. at the outlet of the vortex cyclone dust collecting equipment 104 to transport $CaCO_3$ which has come through the calcination procedure to the feed system 102, i.e. the top device of the vortex cyclone dust collecting equipment 104. After gas solid separation in the vortex cyclone dust collecting equipment 104, powders of $CaCO_3$ are exerted by gravity to fall through devices of the vortex cyclone dust collecting equipment 104 and cross with a flue gas transported from the bottom side to the top side, wherein the flue gas is a burning reacting product from a burner, and the flue gas comprises $H_2O$ and $CO_2$ in the embodiment. After heat fully exchanging, calcination reaction is generated to form CaO and release $CO_2$. In the embodiment, the flue gas has a temperature of 500° C.~1000° C. The flue gas comprising $CO_2$ is transported to the feed system through the blower 108, wherein the flue gas acts as a carry gas of the powders. Part of the flue gas is released to be prepared to be sequestrated or reused and to maintain pressure and mass conservation of the entire system. Another part of the mixture gas is used as a carry gas and is added with a suitable amount of oxygen, for example pure oxygen having concentrations larger than 93%, to be heated along with fuel to 900-1200° C. for use as a combustion gas of the vertical combustion kiln 106 after gas solid separation. The mixture gas is then moved to the bottom device of the vortex cyclone dust collecting equipment 104 to increase $CO_2$ concentration and also has a function of restraining high temperature of oxygen combustion to prevent powder sintering and equipment damage. Thereafter, the powder is moved into the powder purge system 110. The quantity of recirculation flow is a key point of controlling flue gas temperature of the equipment. The flue gas flows from bottom to top to fully exchange heat with powders and provides calcination power required for powders, wherein the primary compositions of the hot flue gas are $CO_2$ and steam. Calcination powers can use metal carbonate salts, such as $CaCO_3$, $ZnCO_3$, $MgCO_3$, $MnCO_3$, or $NiCO_3$, etc, as an adsorbent. If the hot flue gas is to be sequestrated or $CO_2$ is to be reused, a step can be performed to separate the water and obtain a high concentration $CO_2$ after cooling down and condensation. The vertical combustion kiln is helpful to improve insufficient removal of carbonate. Height of the vertical combustion kiln 106 can be increased to extend the powder residence time and thus calcination reaction rate can be kept to be more than 90%.

According to the description above, the recirculated-suspension pre-calciner system of the disclosure uses the concept of oxy-combustion to perform $CO_2$-$O_2$ combustion in the calciner. The disclosure calcines metal carbonate salts, uses a flue gas recirculation way to keep temperature of the inlet flue gas at 900-1200° C., and gradually increases $CO_2$ concentration of flue gas in the calciner.

While the disclosure has been described by way of example and in terms of the preferred embodiments, it is to be understood that the disclosure is not limited to the disclosed embodiments. It is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A recirculated-suspension pre-calciner system, comprising:
    a vortex cyclone dust collecting equipment comprising a plurality of devices connected in series from highest to lowest, with a bottom side of each higher device of the vortex cyclone dust collecting equipment in the series directly connected through a rotary valve or flange to a next lower device of the vortex cyclone dust collecting equipment in the series;
    a vertical combustion kiln comprising a top side and a bottom side, wherein the top side of the vertical combustion kiln is connected to a lowest device of the vortex cyclone dust collecting equipment, and the bottom side of the vertical combustion kiln is connected to a highest device of the vortex cyclone dust collecting equipment;
    a blower is connected between the highest device and the second highest device of the vortex cyclone dust collecting equipment to transport flue gas directly from the second highest device to the highest device; and
    a powder purge system is directly connected to the lowest device of the vortex cyclone dust collecting equipment.

2. The recirculated-suspension pre-calciner system as claimed in claim 1, wherein the highest device of the vortex cyclone dust collecting equipment acts as a feed system of the recirculated-suspension pre-calciner system.

3. The recirculated-suspension pre-calciner system as claimed in claim 1, wherein the vortex cyclone dust collecting equipment comprises 3-7 devices.

4. The recirculated-suspension pre-calciner system as claimed in claim 2, wherein powders in the feed system fall into the vortex cyclone dust collecting equipment and pass through a plurality of the devices to mix and exchange heat with flue gas, generating calcination reaction and releasing $CO_2$, and the flue gas comprising $CO_2$ is transported to the feed system by the blower and acts as a carrier gas of powders.

5. The recirculated-suspension pre-calciner system as claimed in claim 4, wherein the powders comprise $CaCO_3$.

6. The recirculated-suspension pre-calciner system as claimed in claim 4, wherein the calcination reaction uses a metal carbonate salt as an adsorbent.

7. The recirculated-suspension pre-calciner system as claimed in claim 4, wherein the metal carbonate salt comprises $CaCO_3$, $ZnCO_3$, $MgCO_3$, $MnCO_3$, or $NiCO_3$.

8. A method for using a recirculated-suspension pre-calciner system, comprising:
    providing a vortex cyclone dust collecting equipment comprising a plurality of devices connected in series from highest to lowest, with a bottom side of each higher device of the vortex cyclone dust collecting equipment in the series directly connected through a rotary valve or flange to a next lower device of the vortex cyclone dust collecting equipment in the series, a vertical combustion kiln, a blower and a powder purge system, wherein a top device of the vortex cyclone dust collecting equipment acts as a feed system;
    causing powders in the feed system to fall into the vortex cyclone dust collecting equipment and pass through a plurality of the devices to mix and exchange heat with flue gas comprising $CO_2$, generating calcination reaction and releasing $CO_2$; and
    transporting the flue gas comprising $CO_2$ to the feed system through the blower, wherein the flue gas acts as a carrier gas of the powders;
    wherein the vortex cyclone dust collecting equipment comprises a plurality of devices;
    wherein the vertical combustion kiln comprises a top side and a bottom side, wherein the top side of the vertical combustion kiln is connected to a lowest device of the vortex cyclone dust collecting equipment, and the bottom side of the vertical combustion kiln is connected to a highest device of the vortex cyclone dust collecting equipment;
    wherein the blower is connected between the highest device and the second highest device of the vortex cyclone dust collecting equipment to transport flue gas directly from the second highest device to the highest device; and wherein the powder purge system is directly connected to the lowest device of the vortex cyclone dust collecting equipment.

9. The method for using a recirculated-suspension precalciner system as claimed in claim 8, wherein a part of the flue gas comprising $CO_2$ transported to the feed system is combusted with pure oxygen in the vertical combustion kiln.

10. The method for using a recirculated-suspension precalciner system as claimed in claim 9, wherein the combusted gas is moved to a bottom device of the vortex cyclone dust collecting equipment.

11. The method for using a recirculated-suspension precalciner system as claimed in claim 9, wherein pure oxygen and fuel are added during the combustion with pure oxygen.

12. The method for using a recirculated-suspension precalciner system as claimed in claim 9, wherein temperature of the combustion with pure oxygen is 900° C.-1200° C.

13. The method for using a recirculated-suspension precalciner system as claimed in claim 8, wherein the powders comprise $CaCO_3$.

14. The method for using a recirculated-suspension precalciner system as claimed in claim 8, wherein the powders are reacted to form CaO through calcination.

15. The method for using a recirculated-suspension precalciner system as claimed in claim 8, wherein the flue gas comprising $CO_2$ released from calcination has a temperature of 600-1000° C.

16. The method for using a recirculated-suspension precalciner system as claimed in claim 8, wherein the flue gas has a temperature of 500-1000° C.

17. The method for using a recirculated-suspension precalciner system as claimed in claim 8, wherein $CO_2$ of the released flue gas is sealed or reapplied in a further process step.

18. The method for using a recirculated-suspension precalciner system as claimed in claim 8, wherein the calcination uses a metal carbonate salt as an adsorbent.

19. The method for using a recirculated-suspension precalciner system as claimed in claim 18, wherein the metal carbonate salt comprises $CaCO_3$, $ZnCO_3$, $MgCO_3$, $MnCO_3$, or $NiCO_3$.

* * * * *

UNITED STATES PATENT AND TRADEMARK OFFICE
CERTIFICATE OF CORRECTION

PATENT NO. : 9,610,536 B2
APPLICATION NO. : 13/590126
DATED : April 4, 2017
INVENTOR(S) : Wei-Cheng Chen et al.

It is certified that error appears in the above-identified patent and that said Letters Patent is hereby corrected as shown below:

On the Title Page

Item (73) should read:
--Assignees: INDUSTRIAL TECHNOLOGY RESEARCH INSTITUTE, HSINCHU (TW); TAIWAN CEMENT CORPORATION, TAIPEI (TW)--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*